(12) United States Patent
Flores et al.

(10) Patent No.: US 6,416,265 B1
(45) Date of Patent: Jul. 9, 2002

(54) TIE-DOWN STRAP ANCHOR AND STORAGE ASSEMBLY

(76) Inventors: Leonard A. Flores, 49021 N. 13th Ave., Phoenix, AZ (US) 85087; Richard D. Wilson, 4832 W. Villa Maria Dr., Glendale, AZ (US) 85308

( * ) Notice: Subject to any disclaimer, the term of this patent is extended or adjusted under 35 U.S.C. 154(b) by 0 days.

(21) Appl. No.: 09/716,618

(22) Filed: Nov. 20, 2000

(51) Int. Cl.[7] .................................................. B60P 7/08
(52) U.S. Cl. ........................ 410/106; 410/109; 410/110
(58) Field of Search ................................. 410/101, 106, 410/109, 110, 112, 116; 24/265 CD, 115 K; 296/43; 248/499

(56) References Cited

U.S. PATENT DOCUMENTS

| | | |
|---|---|---|
| 3,259,353 A | 7/1966 | Webb |
| 3,298,652 A | 1/1967 | Burdick |
| 3,351,356 A | 11/1967 | Clark et al. |
| 3,421,726 A | 1/1969 | Getter |
| 3,595,125 A | 7/1971 | Jacobs |
| 3,841,660 A | 10/1974 | Clark |
| 3,950,010 A | 4/1976 | Robertson |
| 4,191,108 A | 3/1980 | Jones .......................... 410/110 |
| 4,607,991 A | 8/1986 | Porter ......................... 410/110 |
| 4,812,093 A * | 3/1989 | Millar, Jr. .................... 410/110 |
| 4,915,556 A * | 4/1990 | Unger .......................... 410/110 |
| 4,948,311 A * | 8/1990 | St Pierre et al. ............. 410/107 |
| 5,051,047 A * | 9/1991 | Loncaric ....................... 410/77 |
| 5,141,277 A | 8/1992 | Alexander |
| 5,326,203 A | 7/1994 | Cockrell ....................... 410/110 |
| 5,676,508 A * | 10/1997 | Weicht ..................... 410/106 X |
| 5,738,471 A * | 4/1998 | Zenter et al. ................ 410/110 |
| 5,823,725 A * | 10/1998 | Goodwin ................. 410/106 X |
| 5,915,900 A * | 6/1999 | Boltz .......................... 410/110 |
| 6,000,890 A * | 12/1999 | Macais .................... 410/106 X |
| 6,059,499 A * | 5/2000 | Bird ......................... 410/106 X |

* cited by examiner

Primary Examiner—Stephen T. Gordon
(74) Attorney, Agent, or Firm—John D. Lister

(57) ABSTRACT

A vehicle tie-down strap anchor and storage assembly includes a stake pocket anchor assembly for anchoring a tie-down strap to and storing a tie-down strap in a vehicle stake pocket and/or a tie-down strap anchor and storage box assembly adapted to be secured to a toolbox or surface in a cargo bed portion of a vehicle. The anchor for the stake pocket anchor assembly is resilient and has a generally V-shaped configuration with a base portion and a pair of arms extending upward and outward from the base portion to contact an interior surface of an upper wall of a vehicle stake pocket to retain the stake pocket anchor within the vehicle stake pocket. A tie-down strap is secured to the base of the anchor and, when not in use, can be stored within the vehicle stake pocket between the arms of the anchor. A tie-down strap is secured within the tie-down strap anchor and storage box assembly and, when not in use, can be stored in the box. Each assembly includes a cover for covering openings in the stake pocket and the box, respectively.

7 Claims, 3 Drawing Sheets

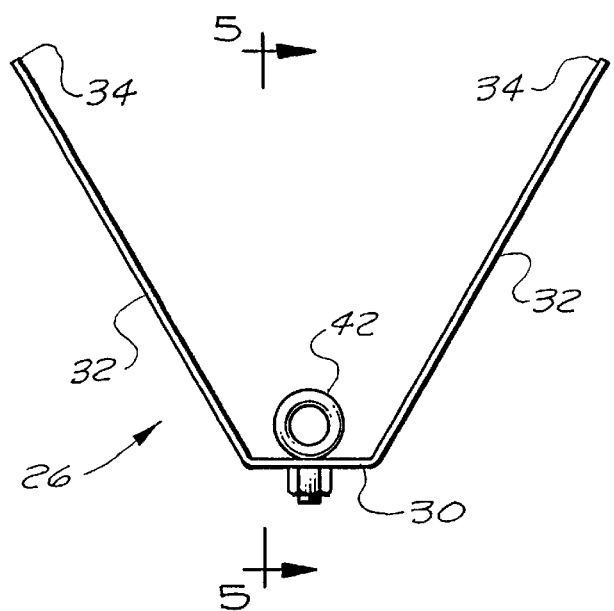
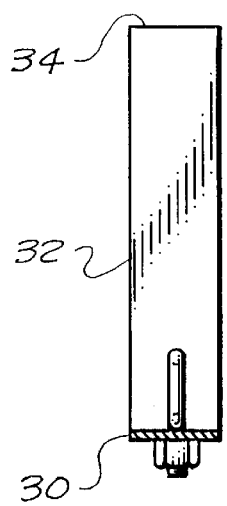
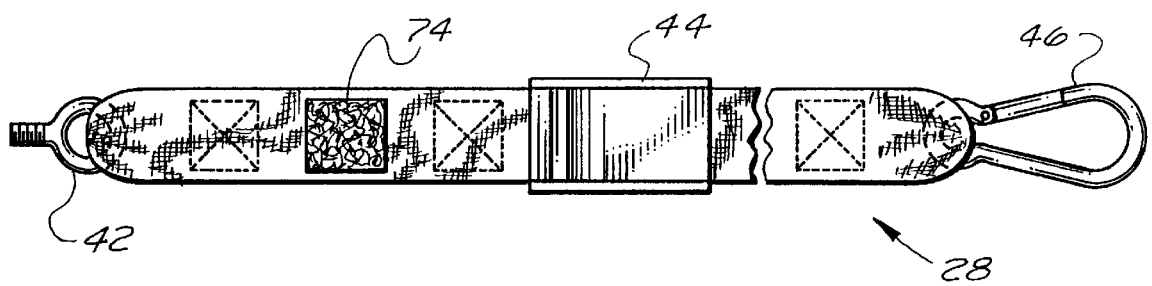
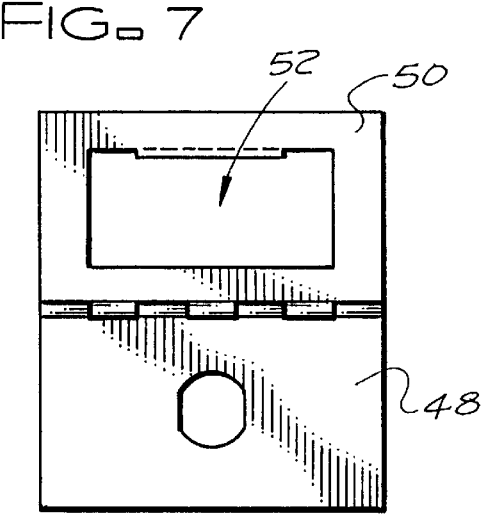
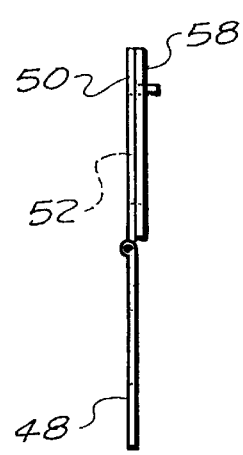
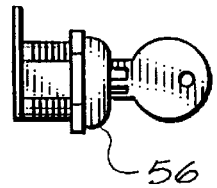

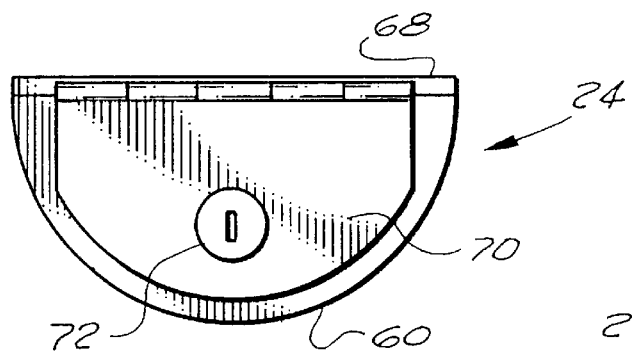
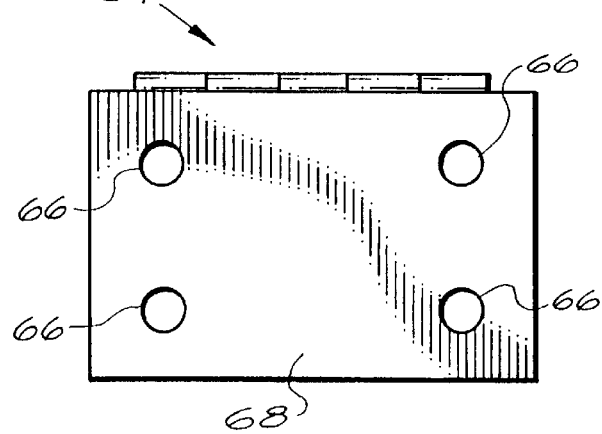
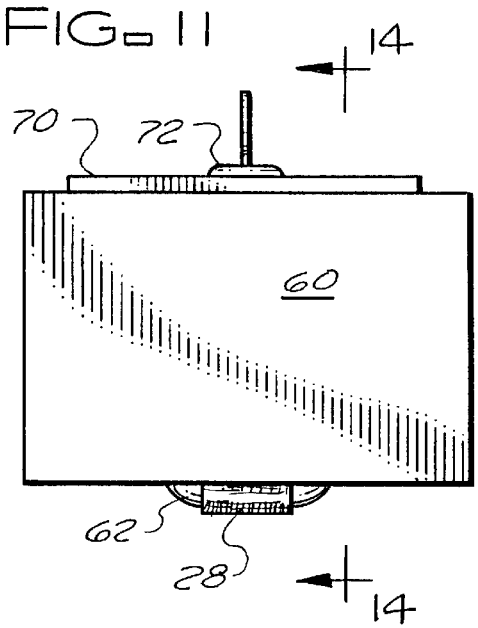
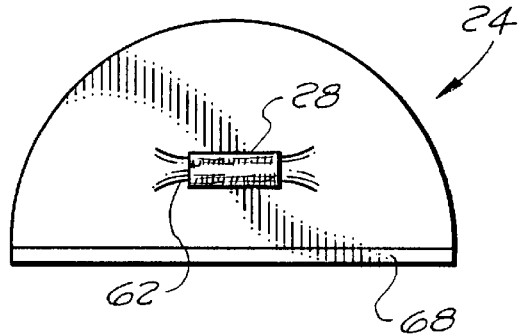
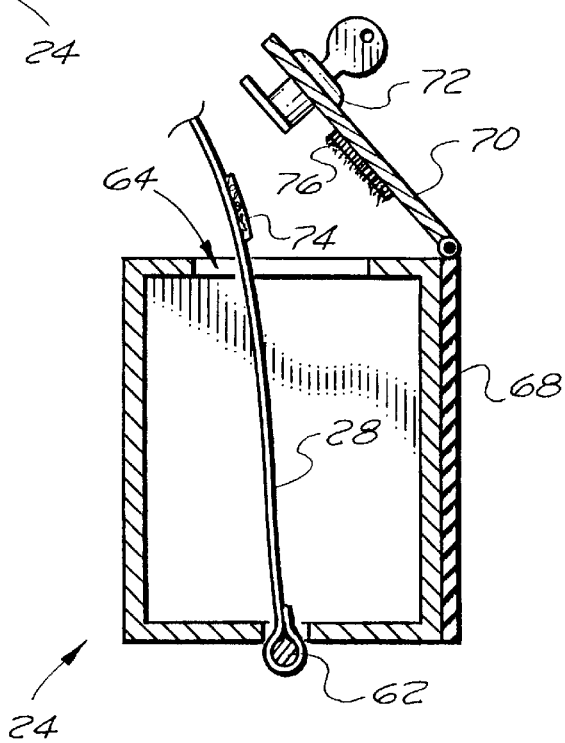

TIE-DOWN STRAP ANCHOR AND STORAGE ASSEMBLY

BACKGROUND OF THE INVENTION

This present invention relates to a tie-down strap anchor and storage assembly which enables tie-down straps to be securely anchored to vehicle stake pockets and/or tool boxes or other surfaces in a cargo bed portion of a vehicle and stored in the vehicle stake pockets and/or boxes secured to tool boxes or other surfaces in a cargo bed portion of a vehicle.

The cargo bed portions of many vehicle bodies, such as pick-up trucks, are typically provided with four to more stake pockets in the double walled sidewalls of the vehicle body on either side of the cargo bed. These stake pockets typically have generally rectangular shaped openings in the upper horizontally extending wall portions of the sidewalls that extend between the inner and outer double walls of the sidewalls. The stake pockets extend down into the sidewalls and are normally used to receive and retain upright stakes along either side of the cargo bed of the vehicle to help contain cargo, that extends above the sidewalls on either side of the cargo bed, within the cargo bed portion of the vehicle. However, for many loads it is advantageous to use tie-down straps, ropes, etc. rather than stakes to contain the cargo within the cargo bed portion of the vehicle.

In the past there have been many attempts to provide stake pocket anchors that can be used to anchor tie-down straps, ropes, etc. to the stake pockets of pick-up trucks and other trucks or trailers for the purpose of containing cargo within the cargo bed portion of the vehicle. For example, U.S. Pat. No. 3,259,353, issued Jul. 5, 1966, discloses a rope hook, with a spring loaded anchor, that extends out through the opening of a stake pocket to receive a rope for securing cargo; U.S. Pat. No. 3,298,652, discloses a hook mounting that is secured to a stake pocket by nut and bolt assemblies; U.S. Pat. No. 3,351,356, issued Nov. 7, 1967, discloses a tie-down device with a hook that is secured to the sidewall of the pick-up truck with a threaded fastener and extends above the sidewall of the pick-up truck; U.S. Pat. No. 3,421,726, issued Jan. 14, 1969, discloses a tie-down anchor device with a hook that is secured within a stake pocket by a pair of wedge members and extends above the sidewall of the pick-up truck; U.S. Pat. No. 3,595,125, issued Jul. 27, 1971, discloses a tie-down device with a ring that is secured to a stake pocket by wedged apart strap members and extends above the sidewall of the pick-up truck; U.S. Pat. No. 3,841,660, issued Oct. 15, 1974, discloses a pick-up truck rail assembly and tie-down device that is secured to the stake pockets by threaded mechanical fasteners; U.S. Pat. No. 3,950,010, issued Apr. 13, 1976, discloses a tie-down clamp assembly for a truck vehicle bed which includes a hook that is secured to a stake pocket by threaded mechanical fasteners and extends above the sidewall of the pick-up truck; U.S. Pat. No. 4,191,108, issued Mar. 4, 1980, discloses a tie-down anchor with a ring that is secured to a stake pocket opening by stop legs and projections and extends above the sidewall of the pick-up truck; U.S. Pat. No. 4,607,991, issued Aug. 26, 1986, discloses a tie-down anchor for a truck bed with a ring that is secured to a stake pocket pivoted, spring loaded arms and extends above the sidewall of the pick-up truck; U.S. Pat. No. 5,141,277, issued Aug. 25, 1992, discloses a stake pocket insert with a bolt for a tie down anchor that protrudes from the stake pocket and includes a U-shaped clamp bracket; and U.S. Pat. No. 5,326,203, issued Jul. 5, 1994, discloses a stake pocket anchor, secured to a stake pocket with threaded mechanical fasteners, that has a threaded hole therein for receiving an eye bolt.

While all of these devices can be used as tie-down strap anchors, there has remained a need to provide a low cost, easy to install, tie-down strap anchor and storage assembly that: provides a very secure anchor for a tie-down strap; provides for the storage of the tie-down strap within a stake pocket so that the tie-down strap is readily available but out of the way when not in use; and does not have hooks, eye bolts or similar devices extending above the stake pocket when the tie-down strap anchor is not in use which can be an interference when the truck is being used for other purposes not requiring tie-down straps, such as but not limited to, the placement of camper shells on cargo bed portion the pick-up truck. In addition, there has remained a need to provide a tie-down strap anchor and storage assembly that can be secured to a toolbox or the like when a toolbox is mounted in a cargo bed portion of a vehicle and covering one or more of the stake pockets.

SUMMARY OF THE INVENTION

The present invention solves the problems of the prior art by providing a vehicle tie-down strap anchor and storage assembly which includes a vehicle stake pocket anchor and storage assembly for anchoring a tie-down strap to and storing a tie-down strap in a vehicle stake pocket and/or an anchor and storage box assembly for anchoring and storing a tie-down strap wherein the assembly box is adapted to be secured to a toolbox or other surface in a cargo bed portion of a vehicle. As used herein, the term "tie-down strap" not only includes conventional tie-down straps or belts, but also includes ropes, cables or other similar lines used for securing or tying down loads in the cargo bed portions of pick-up trucks and the like.

The tie-down strap anchor of the stake pocket anchor and storage assembly of the present invention has a generally V-shaped configuration with a base portion and a pair of resilient arms extending upward and outward from the base portion. Upper end portions of the anchor arms are spaced-apart from each other, in an uncompressed or relaxed state, a distance greater than the width of the opening of the vehicle stake pocket within which the anchor is secured, but are compressible toward each other to enable the tie-down strap anchor to be passed through the opening of the vehicle stake pocket into or out of the vehicle stake pocket. In use, upper end portions of the anchor arms of the tie-down strap anchor are in contact with an interior surface of an upper wall of the vehicle stake pocket on either side of the opening of the vehicle stake pocket to retain the tie-down anchor within the vehicle stake pocket. A tie-down strap is secured to the base portion of the tie-down strap anchor. With the tie-down strap secured to the base portion of the tie-down anchor, when there is an upward pull on the tie-down strap by the load or as a load is being tied down, the tie-down strap anchor becomes more securely fixed in place and, when not in use, the tie-down strap can be stored within the vehicle stake pocket between the arms of the tie-down strap anchor. Whether in use or not in use, the tie-down strap anchor is contained within the stake pocket and does not project upward through the stake pocket opening to become an obstruction.

Preferably, the stake pocket anchor and storage assembly also includes a vehicle stake pocket cover plate for closing the stake pocket opening when a tie-down strap stored within and anchored to the stake pocket by the assembly is not in use. The cover plate is hingedly secured to a base plate which has an opening therein through which the tie-down strap anchored within the stake pocket can pass. The base plate is adapted to be secured to an exterior surface of the upper wall of the vehicle stake pocket adjacent the opening in the upper wall of the vehicle stake pocket and the cover plate may include a lock to lock the cover plate closed over the opening of the stake pocket.

The tie-down strap anchor and storage box assembly includes a box with an anchor securing one end of a tie-down strap within the box and an opening through which the tie-down strap can pass. The box has bolt holes or mechanical fasteners for securing the tie-down strap anchor and storage box to a toolbox or other surface in a cargo bed portion of a pick-up or other vehicle. Preferably, the tie-down strap anchor and storage box has a cover hingedly joined to the box to close the opening of the box when the tie-down strap is not in use and being stored in the box. Preferably, the cover includes a lock for locking the cover closed over the opening in the box when the tie-down strap is not in use.

BRIEF DESCRIPTION OF THE DRAWINGS

FIG. 4 is a vertical view of the tie-down strap anchor of the stake pocket anchor and storage assembly.

FIG. 5 is a vertical cross section, taken substantially along lines 5—5 of FIG. 4.

FIG. 6 is side view a typical tie-down strap, used with the tie-down strap anchor and storage assembly of the present invention.

FIG. 7 is plan view of the cover plate and base plate of the stake pocket anchor and storage assembly without a lock.

FIG. 8 is a side view of the cover plate and base plate of the FIG. 7.

FIG. 9 is a side view of a lock for the cover plate of the FIG. 7.

FIG. 10 is a top plan view of a tie-down strap anchor and storage box of the present invention.

FIG. 11 is a front view of a tie-down strap anchor and storage box of the present invention.

FIG. 12 is a bottom plan view of a tie-down strap anchor and storage box of the present invention.

FIG. 13 is a rear view of a tie-down strap anchor and storage box of the present invention.

FIG. 14 is a cross section through the tie-down strap anchor and storage box of the present invention, taken substantially along lines 14—14 of FIG. 11.

DESCRIPTION OF THE PREFERRED EMBODIMENTS

Figure 1:
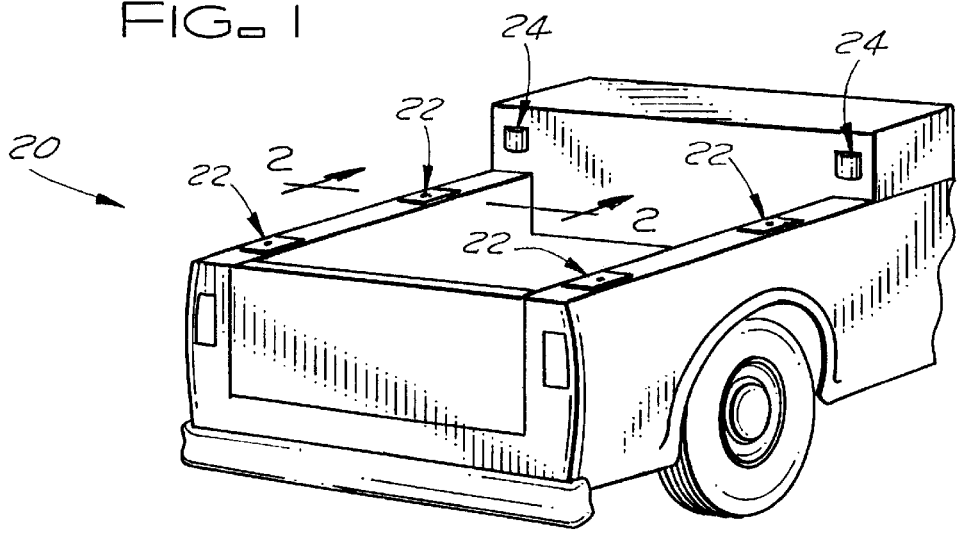
FIG. 1 is perspective view of a cargo bed portion of a conventional pick-up truck with the tie-down strap anchor and storage assembly of the present invention installed in the stake pockets and on a toolbox.

FIG. 1 shows perspective view of a cargo bed portion of a conventional pick-up truck with the tie-down strap anchor and storage assembly 20 of the present invention installed in the stake pockets of the body walls on both sides of the cargo bed and on a toolbox mounted in the cargo bed. As shown, the vehicle tie-down strap anchor and storage assembly 20 includes one or more vehicle stake pocket anchor and storage assemblies 22 for anchoring tie-down straps to and storing tie-down straps in vehicle stake pockets and/or one or more anchor and storage box assemblies 24 for anchoring and storing tie-down straps wherein the assembly is secured to a toolbox or other surface in a cargo bed portion of a vehicle.

Figures 2, 3:
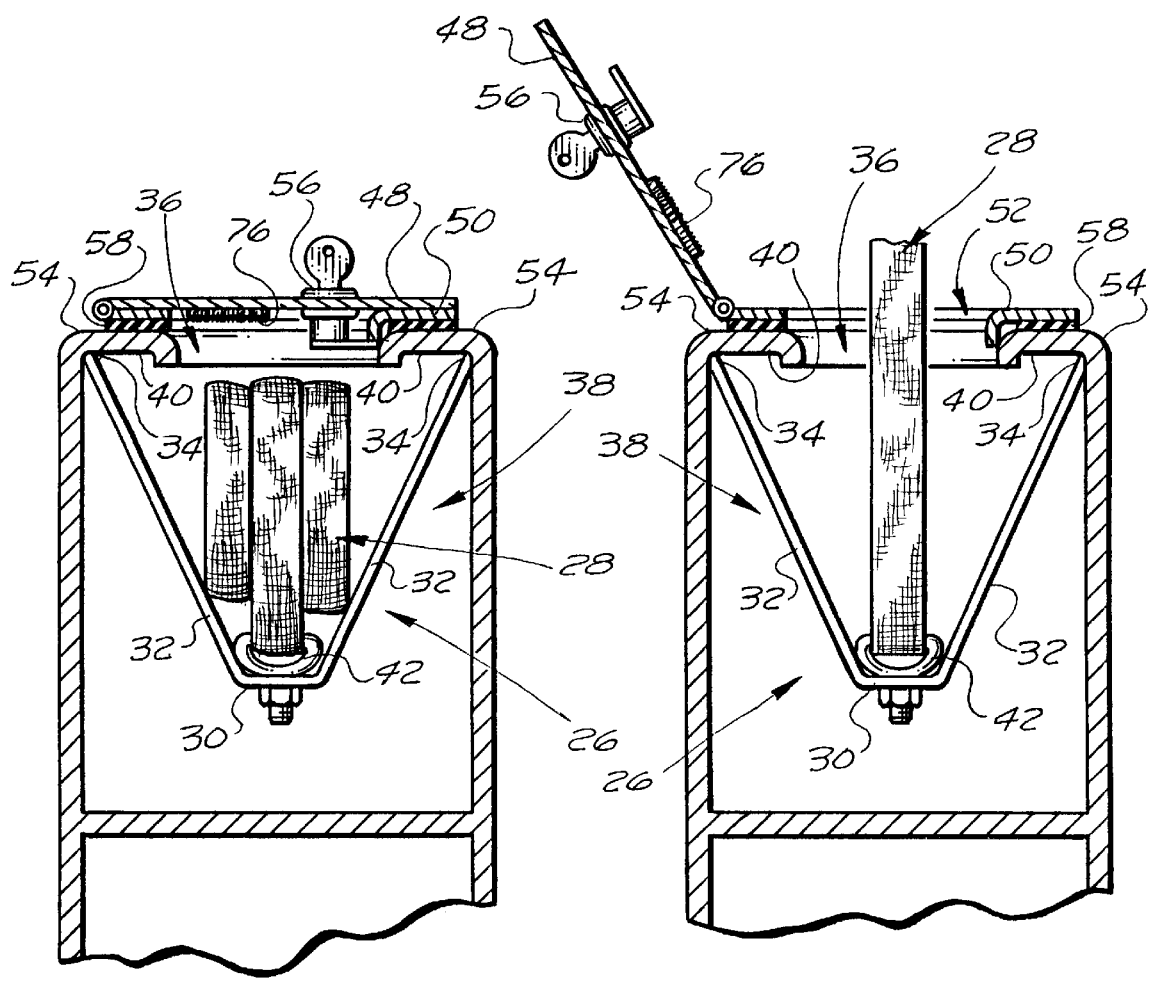
FIG. 2 is a vertical section through a stake pocket, taken substantially along lines 2—2 of FIG. 1, with a tie-down strap anchored within the stake pocket by the stake pocket anchor and storage assembly of the present invention.
FIG. 3 is a vertical section through the stake pocket of,FIG. 2, with the cover plate of the stake pocket anchor and storage assembly open.

A preferred embodiment of the stake pocket anchor and storage assembly 22 of the present invention is shown in FIGS. 2 to 9. The stake pocket anchor and storage assembly includes a tie-down strap anchor 26 and a tie-down strap 28. Preferably, the tie-down strap anchor 26 of the stake pocket anchor and storage assembly 22 is made from a resilient steel strip. The tie-down strap anchor 26 has a generally V-shaped configuration with a base portion 30 and a pair of resilient arms 32 extending upward and outward from the base portion. Upper end portions 34 of the anchor arms 32 are spaced-apart from each other, in an uncompressed or relaxed state, a distance greater than the width of the opening 36 of the vehicle stake pocket 38 within which the anchor 26 is secured, but are compressible toward each other, due to the resilience of the tie-down strap anchor 26 to enable the tie-down strap anchor 26 to be passed through the opening 36 of the vehicle stake pocket into or out of the vehicle stake pocket 38. In use, upper end portions 34 of the anchor arms 32 of the tie-down strap anchor 26 are in contact with an interior surface 40 of an upper wall of the vehicle stake pocket 38 on either side. of the opening 36 of the vehicle stake pocket to retain the tie-down anchor 26 within the vehicle stake pocket. The tie-down strap 28 is secured to the base portion 30 of the tie-down strap anchor 26, preferably, by a round or oblong shaped eye bolt and nut assembly 42 or by welding a round or oblong shaped eye bolt to the base portion of the anchor 26. With the tie-down strap 28 secured to the base portion 30 of the tie-down anchor 26, when there is an upward pull on the tie-down strap 28 by the load or as a load is being tied down, the tie-down strap anchor 26 becomes more securely fixed in place within the stake pocket 38 and, when not in use, the tie-down strap 28 can be stored within the vehicle stake pocket 38 between the arms 32 of the tie-down strap anchor 26 as shown in FIG. 2. Whether in use or not in use, the tie-down strap anchor 26 is contained within the stake pocket 38 and does not project upward through the stake pocket opening 36 to become an obstruction.

In a preferred embodiment of the stake pocket anchor and storage assembly 22, the anchor is made of $\frac{1}{16}$ inch thick resilient steel about 1¼ inches wide. The base portion 30 of the tie-down strap anchor 26 is about $1\frac{11}{32}$ inches wide and the arms 32 are about 5 inches long with the upper end portions 34 of the arms spaced apart, in their uncompressed or relaxed state, about $6\frac{11}{32}$ inches. The eye bolt is ¼ inch round or oblong eye bolt. Preferably, the tie-down strap 28 is a conventional tie-down strap, e.g. a 8 foot long, 1 inch wide, adjustable nylon strap, rated at 800 pounds, with a 1 inch spring loaded cam buckle 44. As shown in FIG.6, one end of the tie-down strap 28 is looped through and permanently secured to the eye bolt 42. The other end of the tie-down strap 28 may have a carabiner 46 or other hardware permanently secured thereto.

Preferably, the stake pocket anchor and storage assembly 22 also includes a vehicle stake pocket cover plate 48 for closing the stake pocket opening 36 when a tie-down strap 28 stored within and anchored to the stake pocket 38 by the assembly 22 is not in use. As shown in FIGS. 2 and 3 and 7 to 9, the cover plate 48 is hingedly secured to a base plate 50 which has an opening 52 therein through which the tie-down strap 28 anchored within the stake pocket 38 can pass. The base plate 50 is secured to an exterior surface 54 of the upper wall of the vehicle stake pocket 38 adjacent the opening 36 in the upper wall of the vehicle stake pocket and the cover plate 48 may include a lock 56 to lock the cover plate closed over the opening of the stake pocket. A preferred method of securing the base plate 50 to the exterior surface 54 of the upper wall of the vehicle stake pocket 38 is by the use of a pressure sensitive adhesive 58 on the underside of the base plate 50. The pressure sensitive adhesive can be applied to the underside of the base plate 50 in the form of a double stick tape, such as a double stick tape sold by 3M corporation. The exposed surface of the double stick tape would have a release liner thereon which would be peeled off just prior to applying the base plate 50 to the exterior surface. 54 of the upper wall of the vehicle stake pocket 38.

In a preferred embodiment of the cover plate 48 and base plate 50, the cover and plates are both about 3½ inches long by about 2 inches wide, made of ⅟16 inch steel, and the opening 52 in the base plate 50 is about 2 inches long by about 1 inch wide.

The tie-down strap anchor and storage box assembly 24, shown in FIGS. 10 to 14, includes a box 60 with an anchor 62 securing one end of a tie-down strap 28 within the box and an opening 64, preferably in an upper wall of the box, through which the tie-down strap can pass. As best shown in FIGS. 11, 12 and 14, the anchor 62 is a raised bar, preferably located in and integral with the bottom wall of the box 60, about which one end of the tie-down strap 28 is looped and permanently secured. The box 60 has bolt holes 66 or mechanical fasteners, preferably in the rear wall of the box, for securing the tie-down strap anchor and storage box assembly 24 to a toolbox or other surface in a cargo bed portion of a pick-up or other vehicle. Typically, a rubber pad or gasket 68 is located intermediate the rear surface of the box. 60 and the surface to which the box is being secured to space the box out from the surface. Preferably, the tie-down strap anchor and storage box assembly 24 has a cover plate 70 hingedly joined to the box 60 to close the opening 64 of the box when the tie-down strap 28 is not in use and being stored within the box. Preferably, the cover plate 70 includes a lock 72 for locking the cover plate 70 closed over the opening 64 in the box when the tie-down strap 28 is not in use.

In a preferred embodiment of the anchor and storage box assembly 24, the steel box 60 has a rear wall about 4½ inches wide, a curved generally. semicircular front wall, a height of about 3 inches, and is made of about ⅟16 inch steel.

The tie-down strap 28 may have a VELCRO strip 74 secured to the tie-down strap at a location, when the tie-down strap is use and drawn taught, just above the openings 36 and 52 in the stake pocket 38 and the base plate 50 or just above the opening 64 in the box 60 that can be .engaged with a VELCRO strip 76 on the cover plate 48 or 70 to keep the cover plate from flapping when the cover plate is unlocked and the tie-down strap is in use.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A vehicle tie-down strap anchor and storage assembly, comprising:

a stake pocket anchor for anchoring a tie-down strap to a vehicle stake pocket having an upper opening with a width defined by edge portions of an upper wall of the vehicle stake pocket; the stake pocket anchor being a resilient metal strip having a generally V-shaped configuration with a base portion and first and second arms extending upward and outward from the base portion; the first and second arms of the stake pocket anchor terminating in upper end portions adapted to contact an interior surface of the upper wall of the vehicle stake pocket whereby the stake pocket anchor is retained within the vehicle stake pocket by engaging the interior surface of the upper wall of the vehicle stake pocket with the end portions of the first and second arms of the stake pocket anchor and the stake pocket anchor is contained within the vehicle stake pocket; the upper end portions of the first and second arms of the stake pocket anchor being spaced-apart from each other, in an uncompressed state, a distance greater than the width of the opening of the vehicle stake pocket and being compressible toward each other to enable the stake pocket anchor to be inserted through the opening of the vehicle stake pocket into the vehicle stake pocket;

a tie-down strap secured to the base of the stake pocket anchor whereby an upward pull on the tie-down strap through the opening in the vehicle stake pocket causes the upper end portions of the arms of the stake pocket anchor to be pressed against the interior surface of the upper wall of the vehicle stake pocket and the tie-down strap can be stored within the vehicle stake pocket between the arms of the stake pocket anchor; and a vehicle stake pocket closure means adapted to be secured to an exterior surface of the upper wall of the vehicle stake pocket adjacent the opening in the upper wall of the vehicle stake pocket; the vehicle stake pocket closure means including a base plate, with an opening therein through which the tie-down strap can pass, adapted to be secured to the exterior surface of the upper wall of the vehicle stake pocket and a cover plate hingedly joined to the base plate so that the opening in the base plate and the upper wall of the vehicle stake pocket can be covered or open.

2. The vehicle tie-down strap anchor and storage assembly according to claim 1, wherein:

an underside of the cover base plate has a pressure sensitive adhesive thereon covered by a release sheet so that the cover base plate can be secured to the exterior surface of the upper wall of the vehicle stake pocket, adjacent the opening in the vehicle stake pocket, by peeling away the release sheet and pressing the underside side of the cover base plate onto the exterior surface of the vehicle stake pocket.

3. The vehicle tie-down strap anchor and storage assembly according to claim 1 wherein:

the cover plate includes a locking means for locking the cover plate to the base plate.

4. The vehicle tie-down strap anchor and storage assembly according to claim 1 in combination with:

a tie-down strap anchor and storage box adapted to be secured to a toolbox or surface of a cargo bed portion of a vehicle; the tie-down strap anchor and storage box including an upper wall with an opening therein through which a tie-down strap can pass; a second tie-down strap secured to and stored within the tie-down strap anchor and storage box when not in use; and means for securing the tie-down strap and storage box to a toolbox or surface of a cargo bed portion of a vehicle.

5. The combination device according to claim 4, wherein:

the second tie-down strap is secured to a bottom wall of the tie-down strap anchor and storage box.

6. The combination device according to claim 4, including:

a second cover plate hingedly joined to the upper wall of the tie-down strap anchor and storage box so that the opening in the upper wall of the tie-down strap anchor and storage box can be covered or open.

7. The combination device according to claim 6, wherein:

the second cover plate includes a locking means for locking the second cover plate to the upper wall of the tie-down strap anchor and storage box.

* * * * *